United States Patent [19]
Angersbach et al.

[11] Patent Number: 4,583,028
[45] Date of Patent: Apr. 15, 1986

[54] DRIVE MECHANISM FOR WORKING MACHINES, ESPECIALLY INDUSTRIAL SEWING MACHINES

[76] Inventors: Wolfgang Angersbach, Alfred-Messel-Weg 40, 6100 Darmstadt; Bernd Matthess, Fasanenring 12, 6114 Gross Umstadt/Semd, both of Fed. Rep. of Germany

[21] Appl. No.: 674,839

[22] Filed: Nov. 26, 1984

Related U.S. Application Data

[63] Continuation of Ser. No. 441,625, Nov. 15, 1982, abandoned.

[30] Foreign Application Priority Data

Nov. 13, 1981 [DE] Fed. Rep. of Germany ....... 3245232

[51] Int. Cl.[4] .............................................. H02P 6/02
[52] U.S. Cl. .................................... 318/254; 318/138; 318/439
[58] Field of Search ........................ 318/138, 254, 439

[56] References Cited

U.S. PATENT DOCUMENTS

| | | | |
|---|---|---|---|
| 4,234,838 | 11/1980 | Langley et al. | 318/254 X |
| 4,250,544 | 2/1981 | Alley | 318/254 X |
| 4,270,074 | 5/1981 | Duckworth et al. | 318/138 X |
| 4,479,078 | 10/1984 | Kidd et al. | 318/439 X |

FOREIGN PATENT DOCUMENTS 56-10091 2/1981 Japan .................................. 318/138

Primary Examiner—William M. Shoop, Jr.
Assistant Examiner—Bentsu Ro
Attorney, Agent, or Firm—Antonelli, Terry & Wands

[57] ABSTRACT

Drive mechanism for working machines, especially industrial sewing machines, including a speed-controlled DC motor without a collector, the windings of this motor being supplied by way of a power stage having a full bridge circuit, actuated in dependence on the rotor position of the motor. A safety monitoring circuit responding to overcurrent is associated with the power stage in order to block the full bridge circuit in case of overload. The drive mechanism is furthermore provided with a microprocessor control for the positioning and ancillary functions of the driven working machine.

18 Claims, 11 Drawing Figures

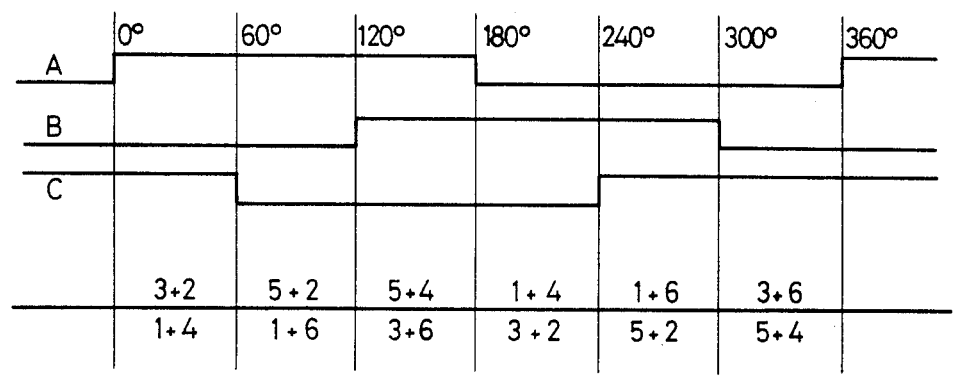
FIG. 2
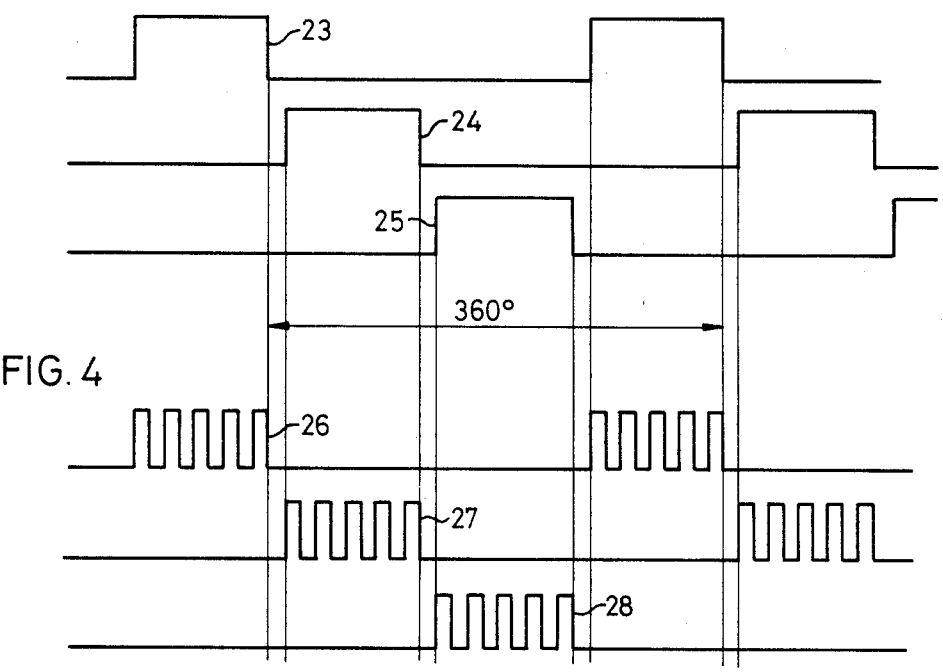
FIG. 3
FIG. 4
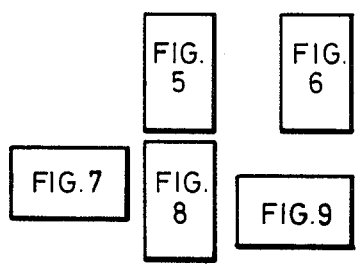
FIG. 10

DRIVE MECHANISM FOR WORKING MACHINES, ESPECIALLY INDUSTRIAL SEWING MACHINES

This is a continuation of application Ser. No. 441,625 filed 11-15-82, now abandoned.

The invention relates to a drive mechanism for working machines, especially industrial sewing machines, including a speed-controlled DC motor without a collector, the windings of this motor being supplied by way of a power stage having a full bridge circuit, actuated in dependence on the rotor position of the motor.

DC motors devoid of a collector have heretofore been utilized predominantly for tasks requiring only relatively small driving power, for example, for record player drive mechanisms. The present invention is based on the object of rendering such a drive mechanism suitable also for use in working machines, such as industrial sewing machines, machine tools, and the like, where there are not only high requirements to be met with regard to drive power, but where there are also great fluctuations in load, and where flexible adaptability to the respective, specific drive tasks is a necessity.

This object has been attained according to this invention by providing in the drive mechanism a power stage which is associated with a safety monitoring circuit responsive to overcurrent for blocking the full bridge circuit in case of overload, and by providing the drive mechanism with a microprocessor control for the positioning and ancillary functions of the driven working machine. The drive mechanism constructed according to this invention is effectively protected against overloads, which must be expected in working machines of the type here under consideration. The drive mechanism furthermore offers great convenience in operation, and requirements posed by a specific customer can be readily accommodated.

As compared with clutch-operated motor drive units, heretofore utilized for such driving tasks, mechanical parts subject to wear and tear, such as clutch disks and brake disks, are eliminated. The thus-attained degree of efficiency achieved by the present invention is therefore higher, and it is also possible to achieve greater positioning accuracies. The drive mechanism can be perfectly controlled without belt transmission within especially large speed ranges, for example, from 10 to 10,000 rpm. The microprocessor control can be designed advantageously in the manner described in U.S. Application Ser. No. 187,971, filed Sept. 16, 1980, in the names of Wolfgang Angersbach and Peter Schuler.

Preferably, the drive mechanism is equipped with an analog speed control circuit. In this connection, the cost for circuit components can be kept at an especially low value by providing that, for speed control, only one of the two arms of a bridge branch, actuated simultaneously during the course of commutation, is under the action of a timing signal which is pulse-width-modulated. Advantageously, the bridge arm respectively connected to ground is acted upon by the timing signal. The latter, in a further development of the invention, exhibits a fixedly predetermined clock frequency of sufficient magnitude, for example, 9 kHz, to preclude acoustic interference noises.

Preferably, a comparator stage is connected in each motor phase for purposes of current monitoring; by means of such comparator stage, the full bridge circuit can be blocked in case the saturation voltage of the power transistors constituting the bridge circuit has been exceeded.

To avoid short-circuiting during commutation, all of the bridge arms are suitably blockable for a short time interval at the instant of commutation. Such a blockage is expediently also provided in case of a reversal of the direction of revolution of the drive mechanism.

In order to prevent uncontrolled turn-on current surges, the speed controller is preferably blockable during standstill of the drive mechanism by way of optical coupling means. To achieve a controlled speed reduction during positioning, the provision is advantageously made to be able to apply, by means of the microprocessor control, step-wise reduced desired values down to standstill during the positioning process.

Additional features of the invention can be seen from the following description of a preferred embodiment. In the appended drawings:

FIG. 2 is a timing diagram showing the commutation signals, as well as the pairing of the power transistors, actuated in series, during right-hand operation and left-hand operation;

FIGS. 3 and 4 are waveform diagrams which show the driver signals for one half and the other half, respectively, of the full bridge circuit;

FIG. 10 is a diagram which shows how FIGS. 5 through 9 are to be composed; and

Figure 1:
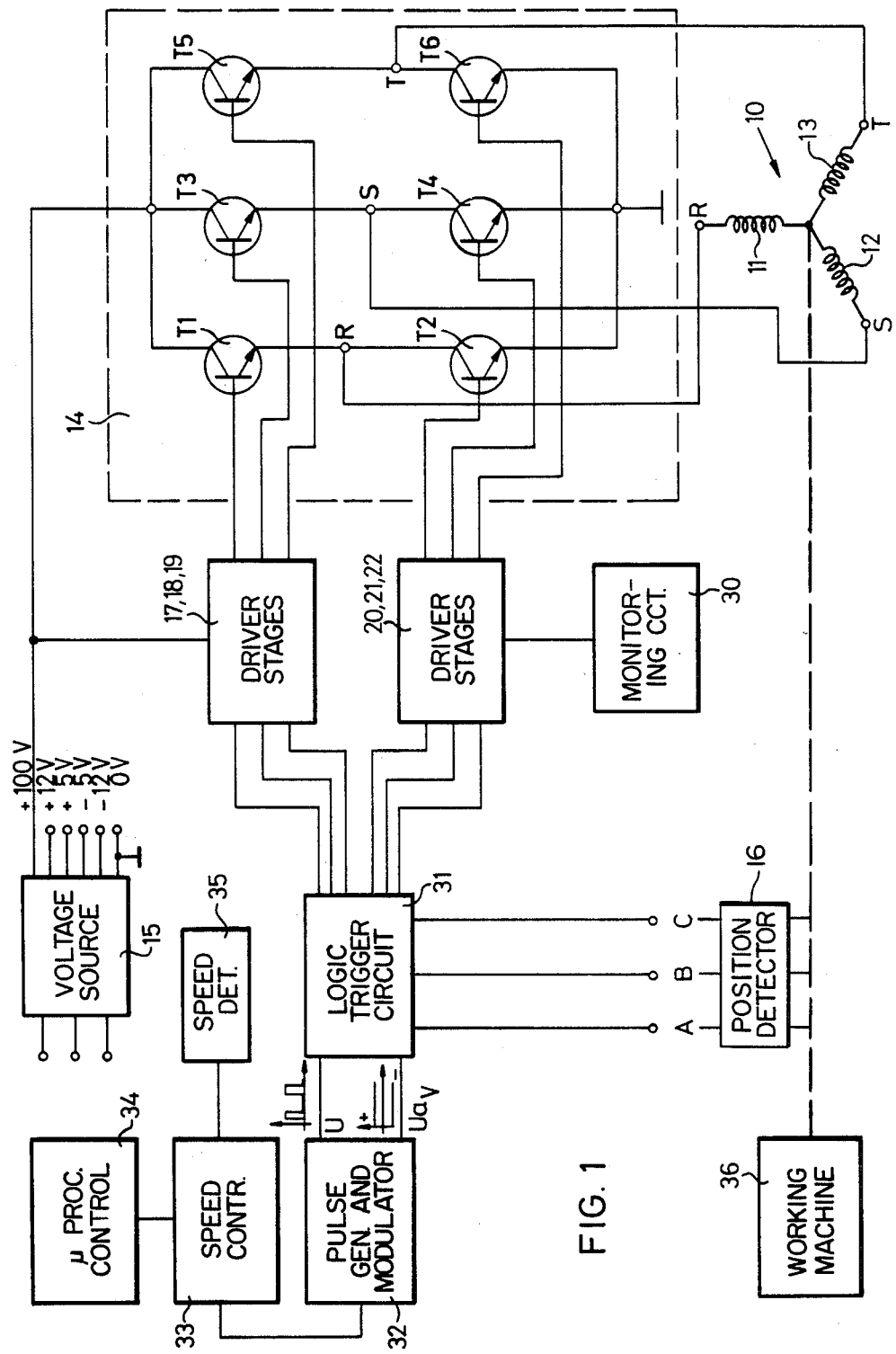
FIG. 1 is a schematic block diagram of a drive mechanism constructed in accordance with this invention.

The drive mechanism illustrated in the circuit diagram in principle shown in FIG. 1 comprises a DC motor without collector, containing a permanent magnet rotor and a three-phase, bipolar or multipolar, preferably quadruple-pole, stator winding indicated at 10. In this embodiment, the stator windings 11, 12 and 13 are in a Y-connection. Their terminals are denoted by R, S, and T. A position detector 16 formed of three rotary position detectors, for example, Hall generators, are conventionally associated with the motor, yielding the commutation signals A, B, and C (FIG. 2) determining the instant of commutation. The windings 11, 12 and 13 are supplied by way of a power stage 14 actuated in dependence on the rotor position. The power stage 14 is designed as a three-phase full bridge circuit with power transistors T1 through T6 so that the motor can operate in a four-quadrant mode; the DC supply voltage derived from a voltage source 15 and being, for example, +100 V, is applied thereto.

FIG. 2 shows which one of the power transistors T1 through T6 is respectively conductive when the motor is operated in right-hand operation or in left-hand operation. Three driver stages 17, 18 and 19 supply current at the commutation frequency to the three power transistors T1, T3 and T5 in alternation. Three additional drive stages 20, 21, 22 are provided to likewise supply current at the commutation frequency alternatingly to the power transistors T2, T4 and T6, but in this case a pulse-width-modulated timing operation takes place with a fixedly predetermined frequency of, for example, 9 kHz. These relationships are indicated in FIGS. 3 and 4, where the driver signals 23, 24 and 25 fed to transistors T1, T3 and T5 and the timed driver signals 26, 27 and 28 for the power transistors T2, T4 and T6 are illustrated. A monitoring circuit 30 is associated with the driver stages 20, 21 and 22; this circuit responds to overcurrent and blocks the power stage 14 in case of overload. In this way, the power transistors T2 through T6 are protected from the occurrence of excessively-high collector currents caused, for example, by a blockage of the motor.

The driver stages 17–22 are controlled by a logic trigger circuit 31. The logic trigger circuit 31 evaluates the commutation signals A, B, and C and provides the sequence of actuation of the driver stages in dependence on the chosen direction of revolution of the motor.

The timing signals are applied by a clock pulse generator and pulse width modulator 32 to the logic trigger circuit 31 at the preselected frequency of, for example, 9 kHz. The respective pulse width is determined by a speed controller 33 comparing the desired speed value and the actual speed value with each other. The pulse width predetermines directly the current flowing into the motor and thus establishes the speed (number of revolutions) of the motor. The desired speed value is applied by a microprocessor control 34 while the actual speed value is produced by a speed detector 35, attached to the motor, for example, via a frequency-voltage conversion. The control range can be between 10 and 6,000 rpm, for example, with a motor power of up to 1.5 kW.

The working machine driven by the motor, for instance, an industrial sewing machine, is indicated at 36. By way of the microprocessor control 34, functions specific to the sewing machine, such as pedal-dependent operating speed, positioning in the needle-upwards or needle-downwards position at, for example, ±2°, thread cutting, pressure foot lifting, etc., can be controlled in the well-known manner.

FIGS. 5 through 9 illustrate circuit diagrams of a preferred embodiment of a drive mechanism intended for an industrial sewing machine. FIG. 10 shows how these figures are to be combined. The power stage 14, as well as the driver stages 17 and 20 for the power transistors T1 and T2 are illustrated in detail in FIG. 7. The driver stages 18 and 19 are of the same design as the driver stage 17, while the driver stages 21 and 22 are of the same design as the driver stage 20.

The logic trigger circuit 31 applies a C-MOS logic signal of, for example, 0 V or 12 V to the input 40 of the driver stage 17. An input signal of 0 V effects blockage of the associated final stage 14 while the latter is made conductive by means of the input signal of 12 V. The driver stage 17 comprises transistors T7 and T8 connected in Darlington configuration. An RC combination consisting of a resistor R1 and a capacitor C1 is connected to the input side of transistor T7. This RC combination makes it possible to provide an increase in base current for transistors T7, T8 at the instant of activation whereby more rapid through-switching is achieved. Two diodes D1 and D2 maintain the Darlington stage T7, T8 in quasi-saturation, which likewise contributes to the fast switching characteristic. The quick switching connection is finally enhanced by the two base-emitter resistors R2, R3 since they ensure a rapid discharge of the base current when the mechanism is turned off.

If the driver stage 17 is conductive, current can flow from the voltage source 15 through a pnp Darlington transistor T9 to the power transistor T1, while the base current of transistor T9 flows to ground via a resistor R4 and the Darlington stage T7, T8. The power transistor T1 amplifies its base current. An emitter current can flow to the motor winding. A base-emitter resistor R5 of the power transistor T1 takes care of improved switching behavior.

In contrast thereto, if the driver stage 17 is blocked, no base current can flow through the Darlington stage T7, T8 to the Darlington transistor T9. Thus, no collector current and no base current flow in the power transistor T1, and therefore, this portion of the power or final stage 14 is blocked.

With the driver stage 17 being conductive, a phase current is caused to flow through the stator winding 10, but only if simultaneously one of the two power transistors T4 or T6 has been made conductive.

The monitoring circuit 30, illustrated in FIG. 1 as a special block for reasons of clarity, is associated with the driver stages 20, 21 and 22 for the power transistors T2, T4 and T6 of the ground-connected bridge branches. In the practical example of FIG. 7, the monitoring circuit is integrated into each of the driver stages 20, 21 and 22.

If the signal 0 V is applied to the input 41 of the driver stage 20, then the final stage is blocked with the power transistor T2. The driver stage 20 comprises an input transistor T10 equipped with antisaturation diodes D3, D4 and D5, and a base-emitter resistor R6 to obtain a switching characteristic satisfactory in regard to the clock frequency of 9 kHz. A voltage of, for example, +12 V is applied to the collector of transistor T10. Accordingly, with transistor T10 nonconductive, the emitter of a subsequently connected transistor T11 is raised to a potential higher than its base potential by way of resistor R7 and diode D6. Thereby, the transistor T11 is blocked, as well as transistors T12 and T13, and this results in a blocking of the power transistor T2. A transistor T14 maintains the bases of transistors T13 and T2 at negative potential.

If a positive voltage of, for example, +12 V appears at the input 41, the transistor T10 becomes conductive. A capacitor C2 is discharged via a resistor R8, with a result that transistor T12 becomes conductive for about 2 ms. Base current flows to transistors T13 and T2, also rendering these transistors conductive. Since a current thus flows via a diode D7 from a resistor R9 to the collector of the power transistor T2, a lower potential appears at the emitter of transistor T11 than at the base of this transistor, whereby transistor T11 becomes conductive. Thereby, even after fading of the pulse via the resistor R8 and the capacitor C2, the transistor T12 is kept conductive, so that the final stage 14 also remains switched through.

If the power transistor T2 cannot enter the quasi-saturation mode within 2 $\mu$s, due to an excessively-high collector current, caused, for example, by blockage of the motor or supply of too low a base current on account of breakdown of the small-scale supply voltage, the voltage at the emitter of transistor T11 is again raised above the base potential of this transistor by the increased collector-emitter potential at the power transistor T2, whereby transistor T11 enters the blocking mode. By blockage of transistor T11, transistor T12, T13 and T2 are likewise blocked.

In this way, the motor and the power transistors are protected in case of a disturbance. Connection is established only for a time period of 2 $\mu$s per pulse, which is not deleterious to the power transistors and the motor.

The normal turning-off operation takes place by application of a voltage of 0 V to the input 41. Thereby, the emitter of transistor T11 is raised to a potential higher than its base potential, initiating the turning-off process, as explained above.

The driver stages 18 and 19, as well as 21 and 22 conform with respect to construction and mode of operation to the driver stages 17 and 20, respectively.

Figure 8:
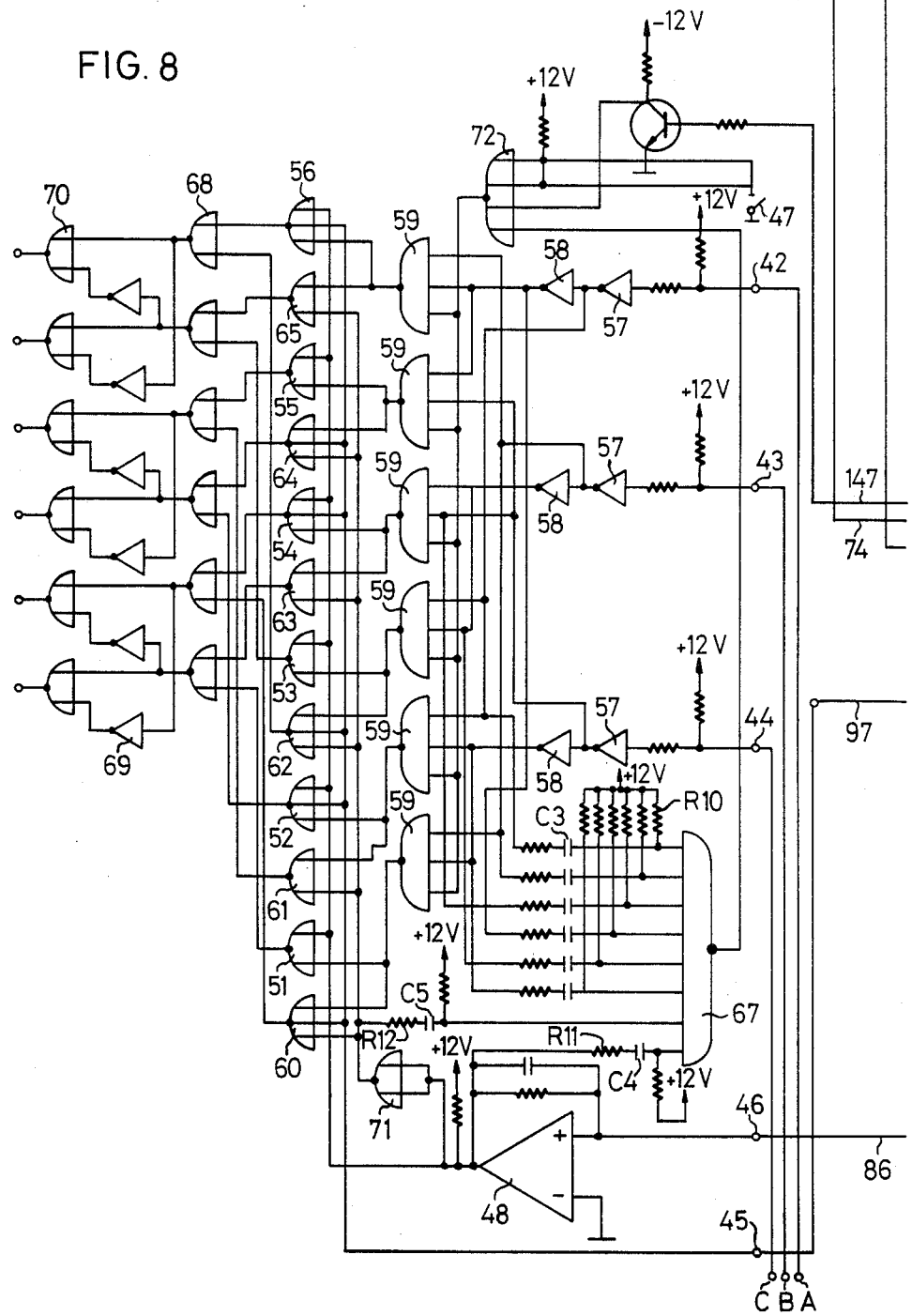

The logic trigger circuit 31 illustrated in FIG. 8 has the task of linking the commutation signals A, B, and C and the input signals transmitted by the clock pulse generator and pulse width modulator 32 and passing them on to the driver stages 17-22 in such a way that the motor executes the desired movement. The commutation signals A, B, and C are applied to inputs 43, 43 and 44, respectively, of the logic trigger circuit 31. These signals, as illustrated in FIG. 2, are mutually displaced by respectively 60° el (in case of a quadruple-pole motor correspondingly by 180° mechanically). Their pulse width corresponds to respectively 180° el. The pulse-width-modulated timing signal coming from the clock pulse generator 32 on line 97 is applied to an input 45 of the logic trigger circuit 31 with a modulating frequency of 9 kHz and a degree of modulation of 0-100% in the form of a +12 V signal. The signal for the direction of revolution, derived from the speed controller 33, is applied from line 86 to an input 46 of the logic trigger circuit 31, this signal having a value of 0 to +12 V with a right-hand direction of rotation in the present embodiment, while a value of 0 to −12 V of this signal corresponds to a left-hand sense of rotation. By way of a switch 47 (FIG. 8), finally, all final stages can be blocked in total.

If a right-hand running signal is applied, for example, to the logic trigger circuit 31 via line 86, the respective analog voltage signal is converted, by means of a comparator 48, into the logic signal H corresponding to +12 V. If, in contrast thereto, the left-hand running signal appears at the input 46, the logic signal L is applied to the output of comparator 48. The output of comparator 48 is connected to NOR gates 51-56. The commutation signals, A, B, and C are inverted in inverters 57, each of which is series-connected to another inverter 58. In this way, the inverted commutation signals, and twice-inverted commutation signals, i.e., signals returned to their original form, are applied to NAND gates 59. The logic connection via these NAND gates 59, the NOR gates 51-56, and six additional NOR gates 60-65 takes place in such a way that the power transistors T1 through T6 are controlled in dependence on the direction of rotation signal and the commutation signals in the sequence indicated in the lower part of FIG. 2. For example, in the electric angle range from 0° to 60°, where A=H, B=L, and C=H, the power transistors T3 and T2 are rendered conductive by the application of a right-hand operation signal to input 46. In this arrangement, an H-signal is applied via the driver stage 18 to the power transistor T3, whereas pulse-width-modulated signals are applied to the power transistor T2 via the driver stage 20. These signals are applied until the motor has revolved mechanically by 30°, and the logic signals A, B, C jump to A=H, B=L, and C=L. Due to the newly-applied commutation information, the power transistors T5 and T2 are activated. This interaction continues in the way illustrated in FIG. 2.

To prevent the occurrence of a short circuit in the power stage 14 at the instant of commutation during the change of one or more of the commutation signals A, B, C, an enforced pause of 100 μs is interposed during each commutation. This is achieved by six RC members R10, C3 to which are applied the commutation signals and/or the inverter commutation signals and which are connected to the inputs of an eightfold NAND gate 67. In case of a change in the commutation signal, all final stages are blocked in this way for 100 μs. Thus, it is ensured that a power transistor is turned on only after the previously-activated power transistor has been safely deactivated. Besides, on account of logic interconnection via six NOR gates 68, connected in series with NOR gates 51-56 and 60-65, via six inverters 69, and six additional NOR gate 70, the objective is achieved that both power transistors in two series-connected bridge branches are never simultaneously activated, i.e., transistors T1 and T2 or T3 and T4, or T5 and T6.

If, during operation of the motor, the direction of rotation signal jumps from right-hand running to left-hand running, or conversely, which initially means braking enforced via the speed controller 33, an enforced rest period of, for example, 5 ms is also interposed so that the motor current can fade. For this purpose, two RC members R11, C4 and R12, C5 are provided, to which is applied the direction of rotation signal and/or the direction of rotation signal inverted by means of a NOR gate 71 connected as an inverter; these RC members are connected to two further inputs of the NAND gate 67. The desired rest interval is enforced by this NAND gate by way of a NOR gate 72. The power stage 14 can also be blocked selectively by applying an H-signal to one of the three additional inputs of the quadruple NOR gate 72 connected to the output of the NAND gate 67.

Figure 9:
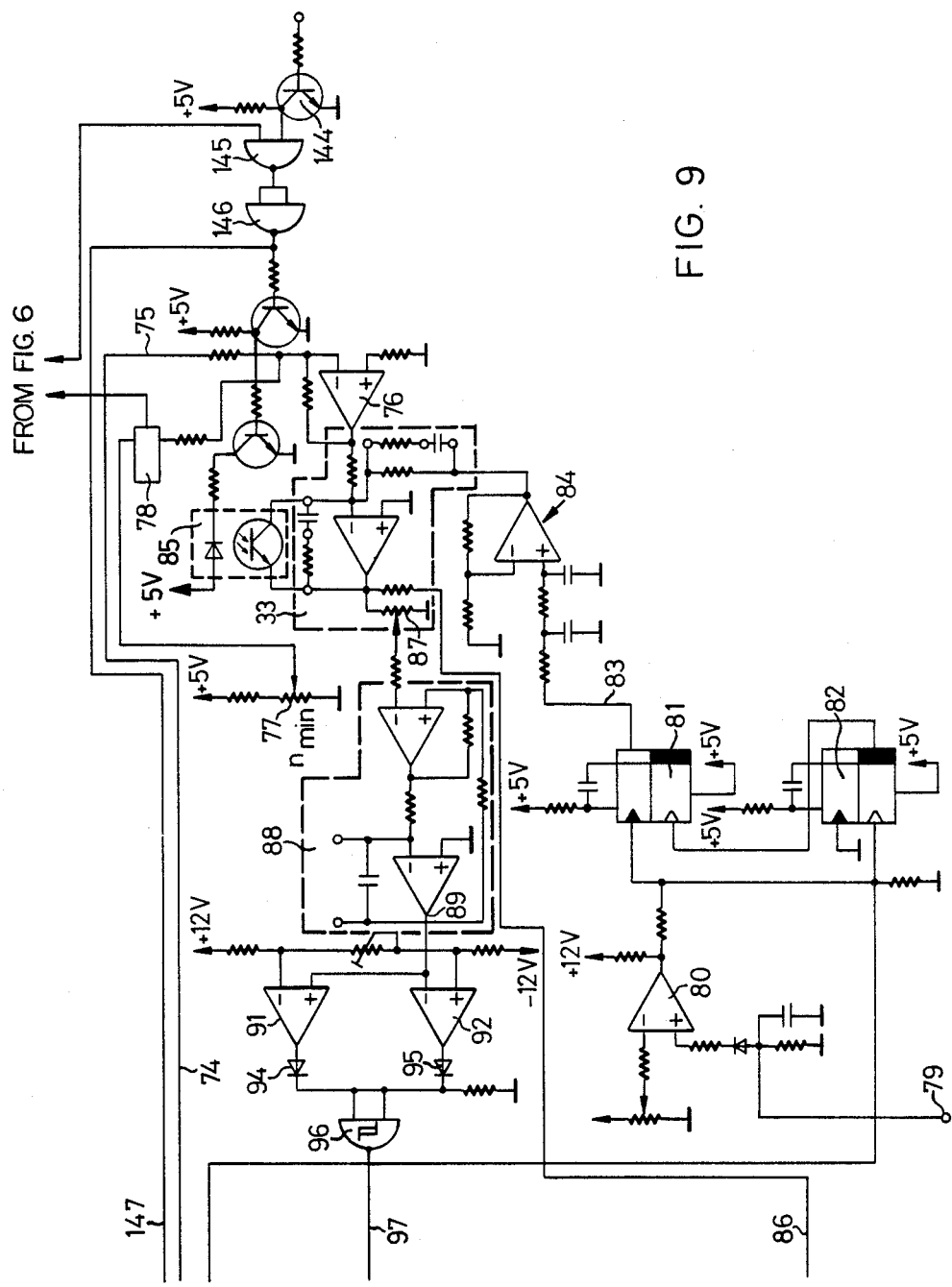

The clock generator and pulse width modulator 32, as well as the speed controller 33, are illustrated in FIG. 9. These circuit stages have the task of regulating the motor speed by transmitting a correspondingly pulse-width-modulated signal to the logic trigger circuit 31 (FIG. 8). An analogous desired speed value, for example, in the form of a signal in the range from 0 to 5 V, is applied by the microprocessor control 34 (FIGS. 5 and 6) via a conductor 74 to the input of the speed controller 33 and is inverted by means of an inverter 76. Furthermore, a minimum speed can be applied by way of a potentiometer 77 and a switching stage 78.

Figure 11:
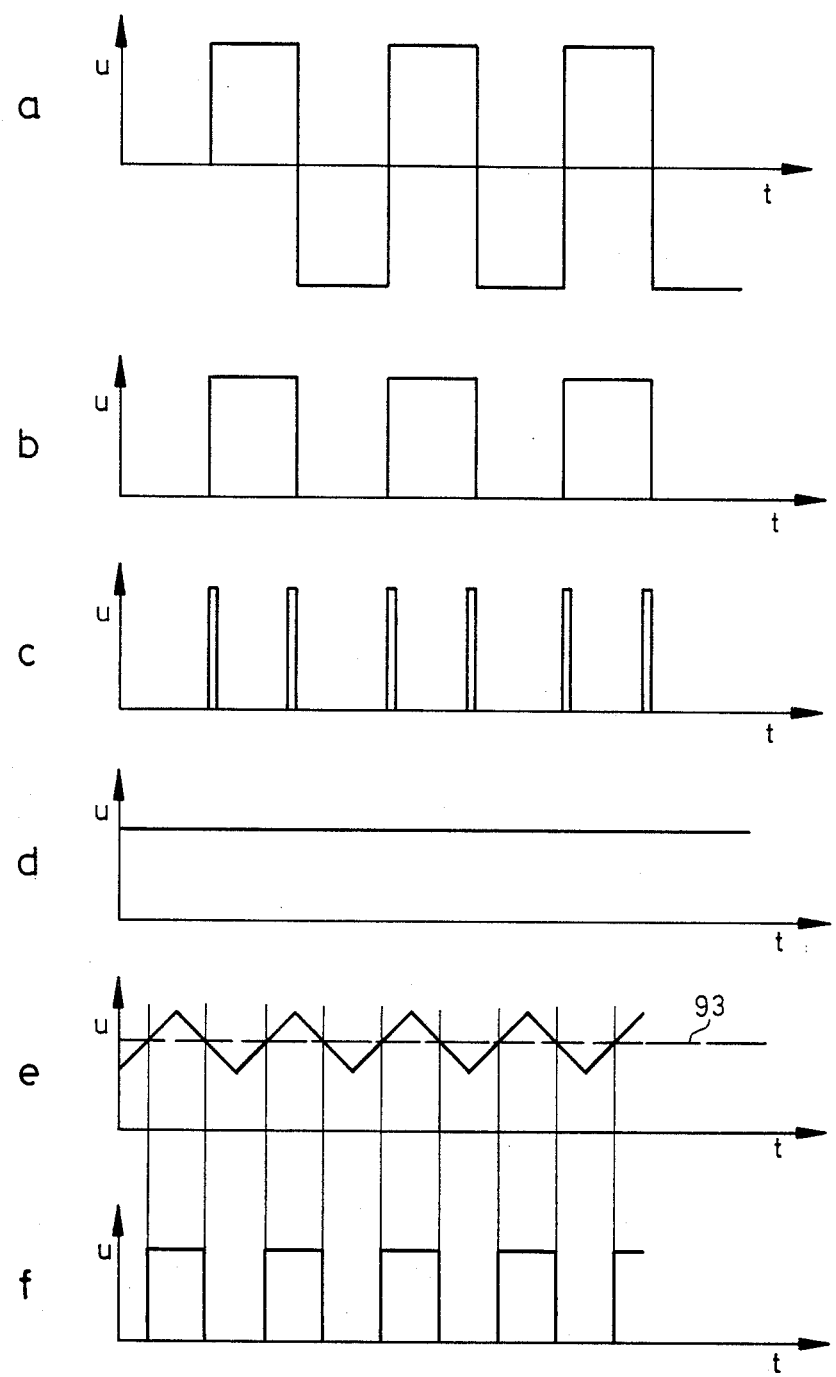
FIG. 11 is a waveform diagram which shows various signal configurations to explain the generation of the pulse-width-modulated timing signals.

The actual speed value is obtained by the speed detector 35 attached to the motor shaft in the form of ±5 V pulses (FIG. 11a) and transmitted to the input 79 (FIG. 9). The speed detector 35 can be constructed in any desired, conventional way. The details of this component are thus not illustrated in greater detail. One example for a suitable speed detector is described in detail in U.S. Pat. No. 3,995,156. The pulses appearing at the input 79 are shaped in a comparator 80 (FIG. 11b) and then applied to two monostable multivibrators 81, 82. The multivibrators 81, 82, are toggled by the leading edges as well as the trailing edges of the signals at the input 79. Therefore, a series of narrow pulses appears at the output line 83 (FIG. 11c), the frequency of which is twice as high as the repetition frequency of the signals at input 79. The narrow pulses according to FIG. 11c are reshaped by an active low-pass filter 84 into an analog signal (FIG. 11d), the amplitude of which is directly proportional to the motor speed.

The analog desired speed value and actual speed value signals are applied to the PID (proportional-integral-differential) speed controller 33, which can yield as the output signal in the present embodiment a signal in the range from −12 V to +12 V. In this connection, a signal of 0 to +12 V corresponds to the right-hand rotation, and a signal of −12 V to 0 V corresponds to the left-hand direction of rotation and/or to braking. To prevent the PID controller from integrating as long as there is no desired value applied, the controller is quasi short-circuited in case of a missing desired value signal by way of an optocoupler 85. The optocoupler 85 permits blockage of the controller 33 independently of whether the controller output signal is positive or negative. The output signal of the speed controller 33 is applied, on the one hand, via a line 86 to the input 46 of the comparator 48 of the logic trigger circuit 31. On the other hand, this signal is applied via a potentiometer 87 to a sawtooth generator 88. The potentiometer 87 permits a predetermination of the maximum pulse width of the clock pulses. The sawtooth signal (FIG. 11e) with a constant frequency of, for example, 9 kHz.

The sawtooth potential is raised or lowered by the analog output signal of the speed controller 33. This signal is applied from output 89 to two symmetrically-biased comparators 91, 92. The bias of, for example, comparator 91 is indicated in FIG. 11e at 93. The comparator 91 processes positive signals; the comparator 92 processes negative signals. The comparator 91 transmits an output signal (FIG. 11f) if the sawtooth potential rises above the bias 93. Corresponding remarks apply to comparator 92. Comparators 91, 92 yield, in this way, rectangular signals of from −12 V to +12 V representing pulse-width-modulated timing signals. The negative proportions are blocked respectively by one of the diodes 94 and 95. The pulse-width-modulated signal is reshaped and inverted in a Schmitt trigger 96, and a rectangular signal of 0 to +12 V at a frequency of 9 kHz, obtained in this way, is transmitted via a line 97 to the input 45 of the logic trigger circuit 31.

The microprocessor control 34 can be constructed in a conventional way. Therefore, it is only briefly decribed hereinbelow. As for additional details, attention is directed to the aforementioned U.S. Application Ser. No. 187,971. The microprocessor control 34 includes the actual microprocessor 101 and a multiplexer 102. The microprocessor 101 transmits addresses to electronic switches 103 to apply predetermined desired values. Addresses are transmitted to the multiplexer 102 from the microprocessor 101 in order to establish connections to memories 104, 105 and 106 by way of the multiplexer 102. The memories 104, 105 and 106 along with the elements 107, 108 and 109 operate as buffer storage elements, the elements 107, 108, 109 being input buffers and the memories 104, 105 and 106 being output buffers. Coded desired value signals can be applied to the inputs 110 to the input buffer 107. In contrast thereto, timing signals from timing elements 115, 116, 117 and 118 are applied to the input buffers 108 and 109. These timing signals indicate different functioning periods for the working machine 36, for example, a cutting period for cutting off the sewing thread. By way of an electronic circuit component 119, one of eight resistors 121 is selectively connected to a capacitor 120. This makes it possible to more easily predetermine different time periods. In the right-hand upper portion of FIG. 6, the outputs customarily provided in industrial sewing machines are illustrated, namely, PFA (automatic presser foot), Sn (cutting), Wi (wiping), and Stst (stitch adjuster, i.e., reversal of transport direction). Input signals are furthermore applied from a setting member for the changeover of the sewing machine arm shaft from a first position into a second position without cutting (connection 122), as well as from a toggle switch for the presser foot operation (connection 123). The switching operation is respectively accomplished by way of one of two optocouplers 124.

As for the switching of the desired value, it is possible via a voltage divider with resistors 125 and potentiometers 126, 127 to selectively provide varying dependencies between the pedal position of the sewing machine and the magnitude of the respective desired value signal. In this connection, the maximum speed of the sewing machine can be adjusted with the aid of potentiometer 126. Potentiometers 128 and 129 determine, for example, the desired speeds for an initial bar tack and a final bar tack, respectively. Potentiometers 130 and 131 serve for the setting of speeds, while the sewing machine counts stitches, starting at a point detected by a photocell, in order to start the final bar tack, for example. The normal cutting speed is predetermined by a potentiometer 132. In special cases with increased cutting speed, an additional desired speed is applied by way of a potentiometer 133. Potentiometers 134 and 135 determine two different intermediate speeds, for example, 500 rpm and 100 rpm, during positioning. With the aid of a potentiometer 136, a desired speed of, for example, 20 rpm, can be applied for final positioning. The potentiometer 137 represents a free function; it can be utilized, for example, for any desired application of speed from the outside. By way of a potentiometer 138, a desired voltage is applied for a short period of time to the speed controller 33, executing the final standstill operation.

Figure 5:
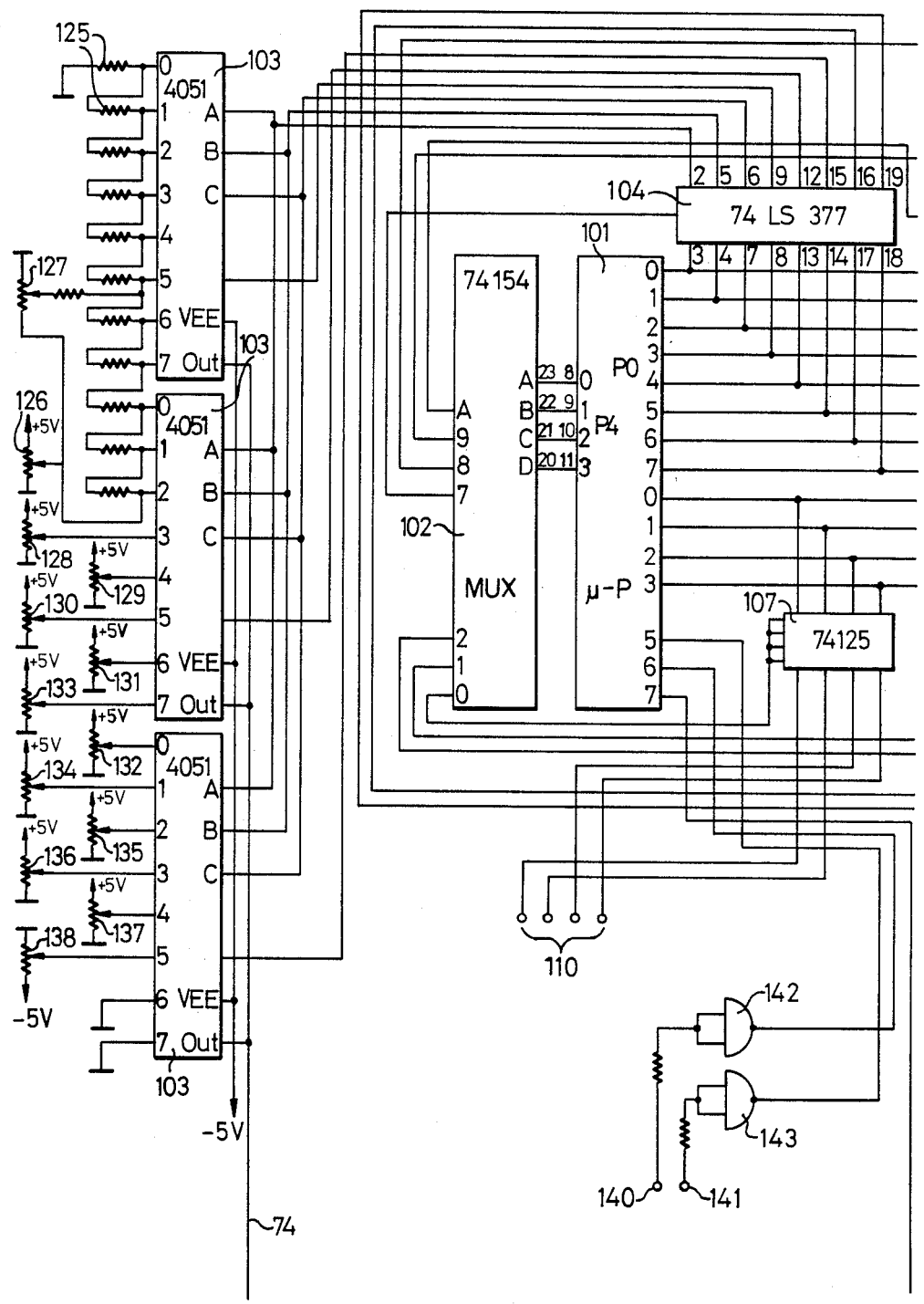
FIGS. 5 through 9 are schematic circuit diagrams which, in combination, provide a detailed circuit diagram of the drive mechanism of FIG. 1.
Figure 6:
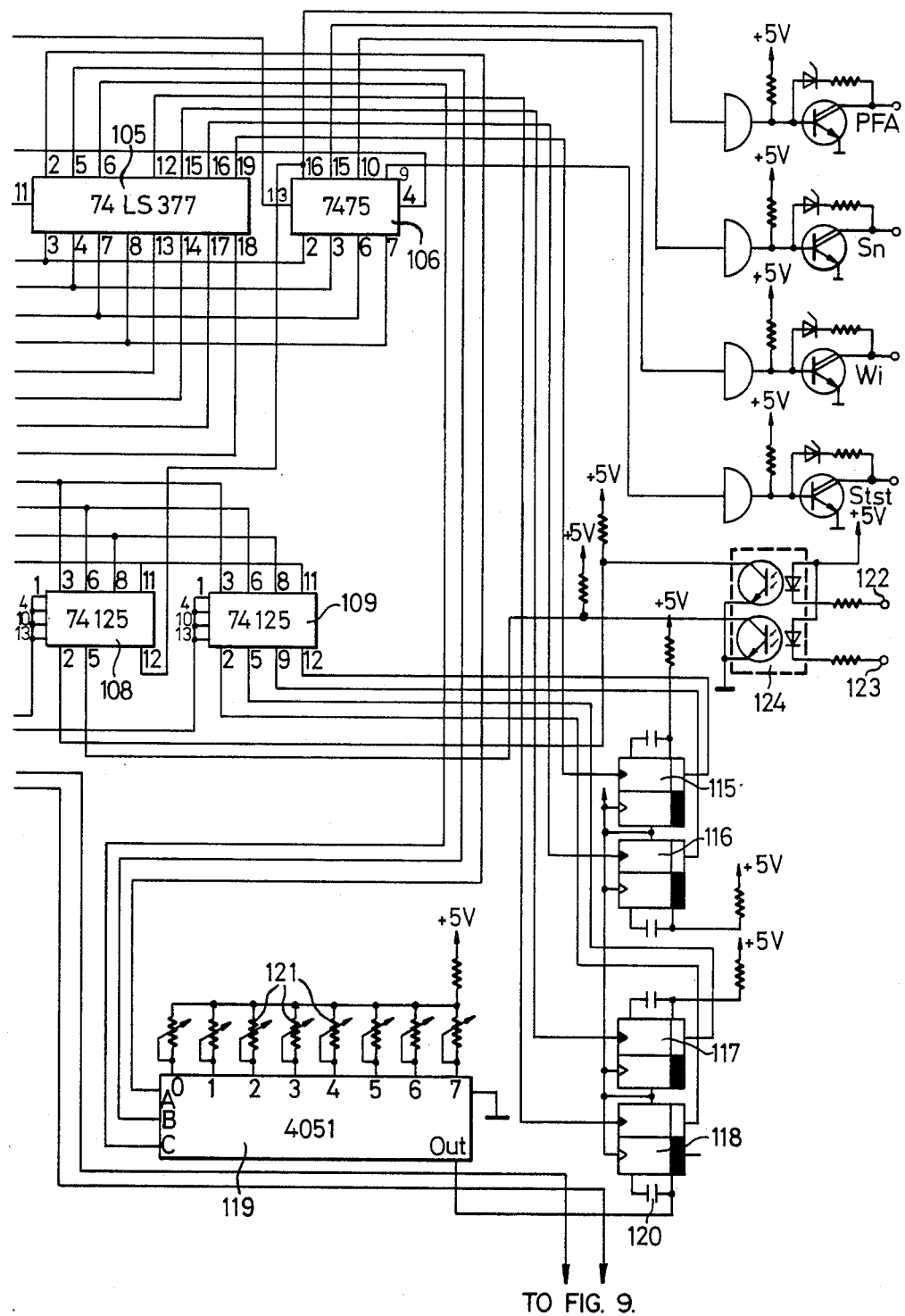
Figure 7:
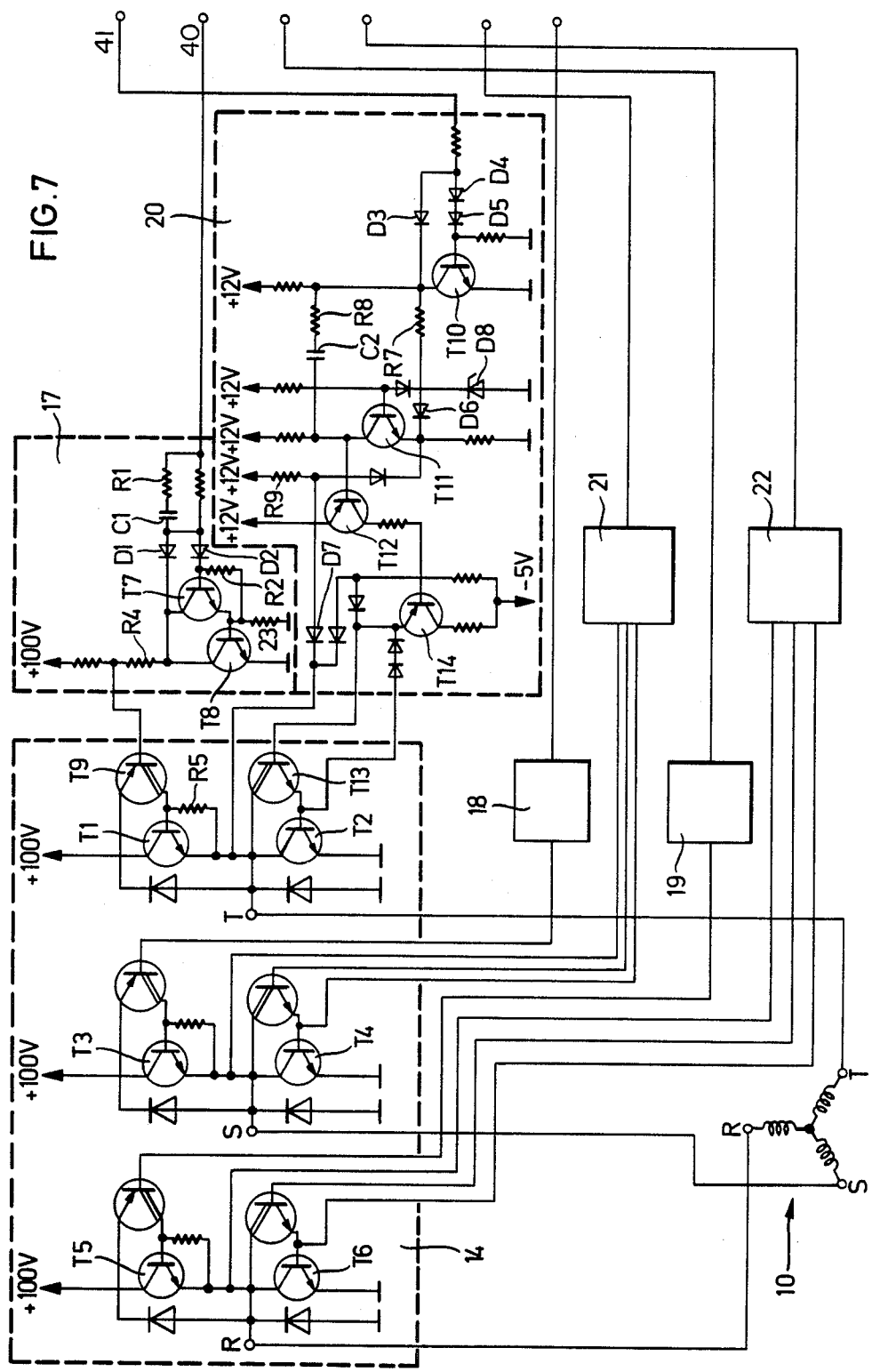

The speed detector 35 provides, in addition to the incremental signals utilized for determining the actual speed value, in the present embodiment additional signals for the positions "needle at the top" and "needle at the bottom" for the industrial sewing machine 36. The first of these signals is applied to an input 140; and the second signal is applied to an input 141 (FIG. 5). In order to render these signals compatible for the connected microprocessor control 34, they are inverted with the aid of inverters 142, 143.

A signal, by means of which the drive mechanism is stopped if the cutting step is performed in a deficient manner, is applied to the logic trigger circuit 31 via a transistor 144 (FIG. 9) and NAND gates 145, 146 as well as via a line 147.

The arresting of the drive mechanism for positioning, for example, in the "needle at the top" position can advantageously be executed by immediately checking the actual speed upon generation of the stop command. If this speed is above 500 rpm, then the desired speed of 500 rpm is applied by means of potentiometer 134 until occurrence of the subsequent positioning signal "needle at the top" at the input 140. If, for example, a complete revolution of the arm shaft of the sewing machine corresponds to the transmission of 240 incremental signals, then the microprocessor counts, from this subsequent positioning signal "needle at the top", 160 incremental signals during which the desired speed of 500 rpm is applied. After 160 increments, switchover then takes place automatically from the desired value of 500 rpm to the desired speed vaue of 110 rpm predetermined by potentionmeter 135. During occurrence of the subsequent "needle at the top" signal, switchover is performed for eight increments to the desired speed value of 20 rpm (potentiometer 136). Thereafter, the braking voltage is applied for a fixedly predetermined time period of, for example, 6 ms, which brings the drive mechanism to a final standstill. In this way, constant speed relationships are always ensured for the last revolution before stoppage.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A drive mechanism for working machines, especially industrial sewing machines, comprising
   a DC motor of the type having no collector, said motor having a rotor and stator windings to which driving voltages may be selectively applied for controlling the speed of the rotor;
   means including a power stage having a full bridge circuit for supplying said driving voltages to said stator windings, said full bridge circuit including a plurality of parallel branches, each branch being made up of a pair of series connected arms in the form of controlled switching devices;
   means for detecting the rotor position of the DC motor;
   microprocessor control means for providing control signals indicating the desired speed and direction of rotation of said rotor;
   controller means responsive to said position detecting means and said microprocessor control means for controlling said power stage to actuate said DC motor in dependence on the rotor position thereof and said control signals, including analog speed control means responsive to said control signals from said microprocessor control means for generating an analog speed control signal, generator means responsive to send analog speed control signal for generating a first continuous pulse signal and a second modulated pulse signal for controlling said full bridge circuit, and said second modulated pulse signal having an overall period corresponding to that of said first continuous pulse signal and being pulse width modulated at a higher fixed frequency sufficient to exclude acoustic interference noises, and logic trigger means responsive to said first and second pulse signals and said position detecting means for selectively actuating respective arms of said full bridge circuit in pairs with said first and second pulse signals, respectively, to selectively apply driving voltages to said stator windings of said DC motor in a predetermined sequence; and
   safety monitoring means connected to said power stage circuit and responsive to an overcurrent in said full bridge circuit for blocking said full bridge circuit.

2. A drive mechanism according to claim 1, wherein said stator windings are Y-connected, with one end of each winding being connected to the mid-point of a respective branch of said full bridge circuit.

3. A drive mechanism according to claim 2, wherein said power stage includes a source of DC voltage connected across said full bridge circuit so that, as said switching devices are actuated in pairs by said logic trigger means, one of said devices is connected to ground, said logic trigger means including means for applying said second pulse signal only to those switching devices in said full bridge circuit which are connected to ground.

4. A drive mechanism according to claim 3, wherein said safety monitoring means includes comparator means for detecting if the saturation voltage of the controlled switching devices is exceeded and means responsive to said comparator means for blocking said full bridge circuit.

5. A drive mechanism according to claim 2, wherein said safety monitoring means includes comparator means for detecting if the saturation voltage of the controlled switching devices is exceeded and means responsive to said comparator means for blocking said full bridge circuit.

6. A drive mechanism according to claim 2, wherein said controller means includes commutating means responsive to said microprocessor control means and said position detecting means for actuating said controlled switching devices in pairs in a commutating manner, and means for blocking all of said controlled switching devices for a short period of time at the instant of commutation to avoid a short circuit of said power stage.

7. A drive mechanism according to claim 2, wherein said controller means includes commutating means responsive to said microprocessor control means and said position detecting means for actuating said controlled switching devices in pairs in a commutating manner in a predetermined sequence to produce a rotation of said rotor at a desired speed and direction, and means responsive to a control signal from said microprocessor control means indicating a change in the direction of rotation of said rotor for blocking all of said controlled switching devices for a short period of time.

8. A drive mechanism according to claim 1, wherein said controller means includes speed control means responsive to said control signals from said microprocessor control means for generating a speed control signal which is reduced in a step-wise manner during reduction of the speed of said rotor to standstill at a predetermined position.

9. A drive mechanism for working machines, especially industrial sewing machines, comprising
   a DC motor of the type having no collector, said motor having a rotor and stator windings to which driving voltages may be selectively applied for controlling the speed of the rotor;
   means including a power stage having a full bridge circuit for supplying said driving voltages to said stator windings;
   means for detecting the rotor position of the DC motor;
   microprocessor control means for providing control signals indicating the desired speed and direction of rotation of said rotor;
   controller means responsive to said position detecting means and said microprocessor control means for controlling said power stage to actuate said DC motor in dependence on the rotor position thereof and said control signals including analog speed control means responsive to said control signals from said microprocessor control means for generating an analog speed control signal; and
   safety monitoring means connected to said power stage circuit and responsive to an overcurrent in said full bridge circuit for blocking said full bridge circuit, wherein said controller means includes means responsive to a zero speed signal from said microprocessor control means for inhibiting said speed control means.

10. A drive mechanism according to claim 9, wherein said inhibiting means includes an optocoupler.

11. A drive mechanism for working machines, especially industrial sewing machines, comprising
a DC motor of the type having no collector, said motor having a rotor and stator windings to which driving voltages may be selectively applied for controlling the speed of the rotor;
means including a power stage having a full bridge circuit for supplying said driving voltages to said stator winding, including a plurality of parallel branches, each branch being made up of a pair of series connected arms in the form of controlled switching devices;
means for detecting the rotor position of the DC motor;
microprocessor control means for providing control signals indicating the desired speed and direction of rotation of said rotor; and
controller means responsive to said position detecting means and said microprocessor control means for controlling said power stage to actuate said DC motor in dependence on the rotor position thereof and said control signals, including speed control means responsive to said control signals from said microprocessor control means for generating a speed control signal, generator means responsive to said speed control signal for generating a first continuous pulse signal and a second modulated pulse signal for controlling said full bridge circuit, said second modulated pulse signal having an overall period corresponding to that of said first continuous pulse signal and being pulse width modulated at a higher fixed frequency sufficient to exclude acoustic interference noises, and logic trigger means responsive to said first and second pulse signals and said position detecting means for selectively actuating respective arms of said full bridge circuit in paris with said first and second pulse signals, respectively, to selectively apply driving voltages to said stator windings of said DC motor in a predetermined sequence.

12. A drive mechanism according to claim 11, wherein said stator windings are Y-connected, with one end of each winding being connected to the mid-point of a respective branch of said full bridge circuit.

13. A drive mechanism according to claim 12, wherein said power stage includes a source of DC voltage connected across said full bridge circuit so that, as said switching devices are actuated in pairs by said logic trigger means, one of said devices is connected to ground, said logic trigger means including means for applying said second pulse signal only to those switching devices in said full bridge circuit which are connected to ground.

14. A drive mechanism according to claim 14, wherein said controller means includes commutating means responsive to said microprocessor control means and said position detecting means for actuating said controlled switching devices in pairs in a commutating manner, and means for blocking all of said controlled switching devices for a short period of time at the instant of commutation to avoid a short circuit of said power stage.

15. A drive mechanism according to claim 4, wherein said controller means includes commutating means responsive to said microprocessor control means and said position detecting means for actuating said controlled switching devices in pairs in a commutating manner in a predetermined sequence to produce a rotation of said rotor at a desired speed and direction, and means responsive to a control signal from said microprocessor control means indicating a change in the direction of rotation of said rotor for blocking all of said controlled switching devices for a short period of time.

16. A drive mechanism according to claim 11, wherein said controller means includes means responsive to a zero speed signal from said microprocessor control means for inhibiting said speed control means.

17. A drive mechanism according to claim 16, wherein said inhibiting means includes an optocoupler.

18. A drive mechanism according to claim 11, wherein said controller means includes speed control means responsive to said control signals from said microprocessor control means for generating a speed control signal which is reduced in a step-wise manner during reduction of the speed of said rotor to standstill at a predetermined position.

* * * * *